United States Patent [19]
Borchering

[11] Patent Number: 5,867,571
[45] Date of Patent: Feb. 2, 1999

[54] METHOD AND ARRANGEMENT FOR ESTABLISHING CALL CONNECTIONS IN A TELECOMMUNICATIONS NETWORK USING A VIRTUAL TRANSPORT SERVER

[75] Inventor: James William Borchering, West Chicago, Ill.

[73] Assignee: Lucent Technologies Inc., Murray Hill, N.J.

[21] Appl. No.: 613,789

[22] Filed: Feb. 23, 1996

[51] Int. Cl.$^6$ .............................. H04M 1/64; H04M 7/00; H04M 3/00; H04M 1/00; H04L 12/50; H04Q 11/00; H04J 3/17

[52] U.S. Cl. ..................... 379/230; 379/67.1; 379/88.17; 379/220; 379/243; 379/444; 370/373; 370/384; 370/385; 370/401; 370/466; 370/467

[58] Field of Search .................................. 379/67, 88, 89, 379/220, 230, 243, 444; 370/373, 384, 385, 401, 466, 467

[56] References Cited

U.S. PATENT DOCUMENTS

| | | | |
|---|---|---|---|
| 5,259,026 | 11/1993 | Johnson | 379/207 |
| 5,329,308 | 7/1994 | Binns et al. | 348/14 |
| 5,390,175 | 2/1995 | Hiller et al. | 370/60 |
| 5,428,607 | 6/1995 | Hiller et al. | 370/60.1 |
| 5,583,920 | 12/1996 | Wheeler, Jr. | 379/88 |
| 5,602,909 | 2/1997 | Carkner et al. | 379/207 |
| 5,703,876 | 12/1997 | Christie | 370/395 |

*Primary Examiner*—Fan S. Tsang
*Assistant Examiner*—Allan Hoosain
*Attorney, Agent, or Firm*—Mony R. Ghose

[57] ABSTRACT

A telecommunications network comprises a virtual transport server (VTS) for making network routing decisions and establishing call connections. Each VTS is interconnected to each signal transfer point in a common channel signaling (CCS) system associated with the network. Each VTS is also interconnected to at least one switch in a transmission network, such as an asynchronous transfer mode (ATM) switch. The VTS maintains routing tables identifying trunk groups associated with each central office switch in the network. During operation, an initial address message received from a signal transfer point in the VTS is processed and subsequently extended to an ATM switch so that a call connection can be established. Upon completion of the established call, the VTS releases resources associated with the ATM switch.

13 Claims, 3 Drawing Sheets

METHOD AND ARRANGEMENT FOR ESTABLISHING CALL CONNECTIONS IN A TELECOMMUNICATIONS NETWORK USING A VIRTUAL TRANSPORT SERVER

TECHNICAL FIELD

This invention relates to telecommunications networks, and more particularly, to a method and system for establishing calls in such telecommunications networks by using a stand-alone server to perform call routing functions.

BACKGROUND OF THE INVENTION

The existing public-switched telephone network (PSTN) comprises: a large number of central office switches for serving local subscriber lines and trunks; a smaller number of tandem (also referred to as "toll" or "transit" switches) for providing connections between central office switches; a plurality of analog and digital communication paths for interconnecting the central office switches and tandem switches; optional databases for storing information; and a common channel signaling (CCS) system for transmitting messages used by the switches to establish call connections. The CCS system includes many inter-connected signal transfer points (STPs) which relay messages among network nodes to establish, manage, and release call paths in the PSTN. To facilitate accurate message delivery, each PSTN switch is assigned a discrete "point code" for identification purposes.

Calls are routed by an "originating" central office switch (that is, the central office switch that serves the caller) to a "destination" central office switch (the central office switch that serves the called party) on the basis of the directory number received in the originating switch from the caller. In the United States, directory numbers are assigned in accordance with a numbering plan requiring each subscriber line to be identified by ten digits. The ten digit directory number comprises a three digit area code which defines a specific geographic region followed by a three digit office code which identifies a particular central office switch in the network. The office code is followed by a four digit subscriber line identifier which establishes the network address of a particular subscriber line on the central office switch associated with the office code digits.

In accordance with current protocol, a call is routed over a call path by the originating switch subsequent to CCS messages being relayed between the originating switch, other network nodes, and the destination switch. Particularly, an initial address message (IAM) is extended from the originating switch to the destination switch, either directly or via tandem switches, to establish trunk connections using a process well-known in the art. The call path between the originating switch and the destination switch is completed by a series of switch "hand-offs" of the call over the established trunk connections. In other words, the originating switch performs both routing (selecting a call path) and switching (establishing call connections on the selected call path) functions to connect a call to a desired called party upon receipt of a dialed directory number.

It is the dual role of determining routes and performing switching functions, however, that induces the inefficient operation of present-day telecommunications networks. This is because the determination of the call path is made by the originating switch and subsequently, any intermediate switches. A problem arises if unforeseen system blockages necessitate an alternate call path. In such cases, the call must be extended back to the originating switch from the node at which the blockage is detected so that the originating switch can devise a new call path. Return of the blocked call to its origination point causes undue delay and taxes network resources. Therefore, there is a need in the art to effectively and efficiently make routing determinations in a telecommunications network.

SUMMARY OF INVENTION

This need is addressed and a technological advance is achieved in the art by the method and system of the present invention in which the routing function is separated from the switching function in a telecommunications network.

In the preferred embodiment of the present invention, a virtual transport server (VTS), equipped with routing information which identifies central office switches by point code and trunk groups, is interconnected to a signal transfer point (or a switch with facility-associated signaling) in a telecommunications network to intercept all signaling messages issued by central office switches. Upon receipt of an initial address message from an originating switch, the VTS identifies a call path from the originating switch to a destination switch via a transmission (switching) network. In the preferred embodiment, the transmission network operates in asynchronous transfer mode (ATM). Once the call connection is established, voice is transmitted over the call path.

When the parties have completed their conversation, the VTS receives a signal so that routing information in the VTS may be updated to reflect that the previously engaged network resources are now available to service other call connections. Further, in networks which deploy multiple VTSs, changes in routing protocol are automatically updated via an exchange of information among VTSs via the signaling system or the transmission network.

BRIEF OF THE DRAWING

FIG. 1 is a simplified block diagram of a telecommunications network arranged in accordance with the preferred embodiment of the present invention; and FIGS. 2A and 2B are flow diagrams of the steps performed in the telecommunications network of FIG. 1 in accordance with the preferred embodiment of the method of the present invention.

DETAILED DESCRIPTION

Figure 1:
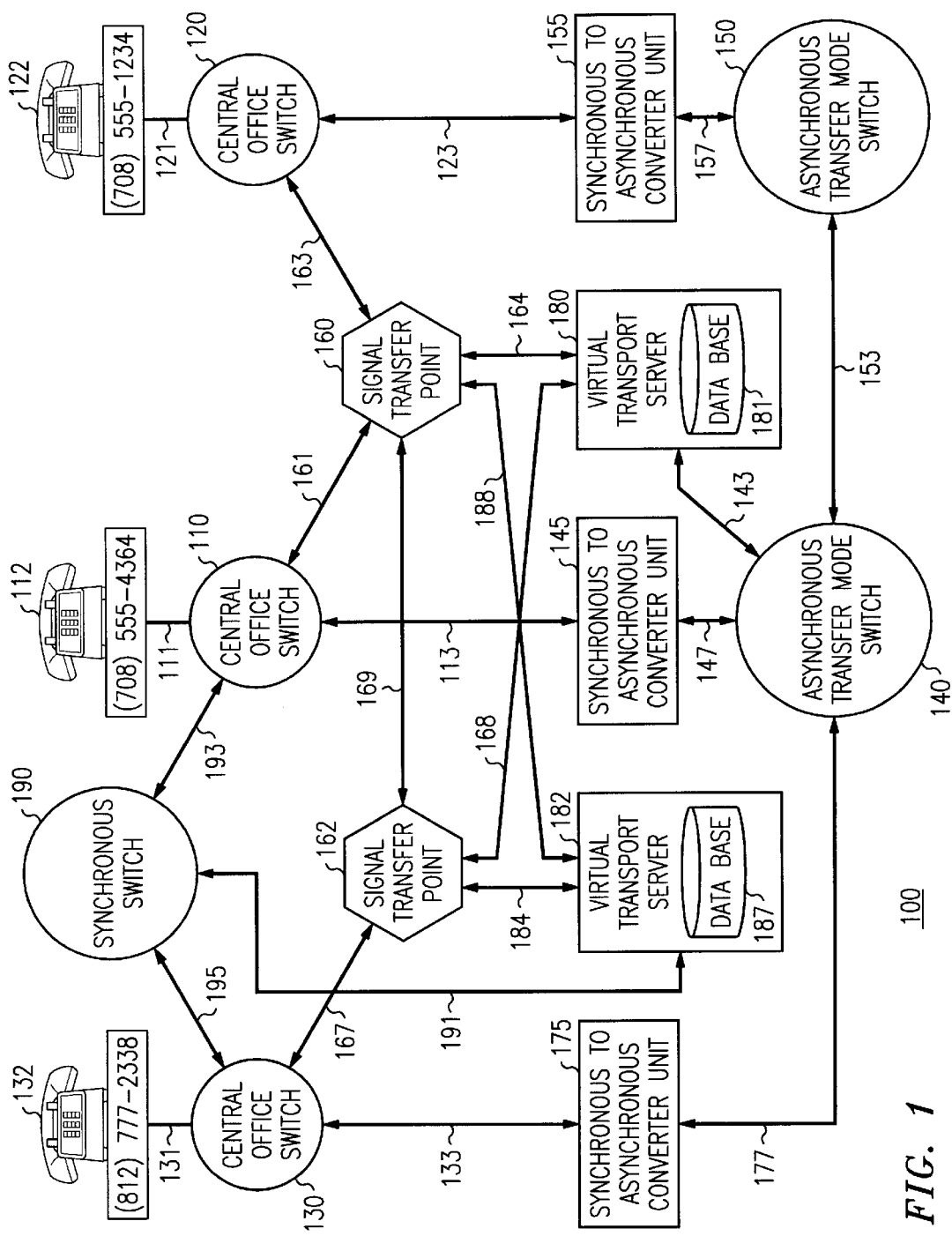

FIG. 1 shows a simplified block diagram of a telecommunications network arranged in accordance with the preferred embodiment of the present invention. Telecommunications network 100 comprises: a plurality of central office switches 110, 120, 130; asynchronous transfer mode (ATM) switches 140, 150; synchronous-to-asynchronous converter (SAC) units 145, 155; and signal transfer points 160, 162, all of which are known in the art. Telecommunications network 100 also includes virtual transport servers (VTS) 180, 182 for determining call paths required for the establishment of call connections. Each VTS is equipped with a database for storing routing information, as described in detail below.

Central office switch 110 (hereinafter, the "originating" switch), serves subscriber line 111 which is interconnected to customer premises equipment (CPE) 112. In this example, assume CPE 112 is identified by the directory number (708) 555-4364. Central office switch 120 serves subscriber line 121 which is interconnected to CPE 122. CPE 122 is identified by the directory number (708) 555-1234. Similarly, central office switch 130 (hereinafter, the "destination" switch) serves subscriber line 131 which is interconnected to CPE 132. CPE 132 is identified by the directory number (812) 777-2338.

In this embodiment, the CCS system comprises signal transfer points (STPs) 160 and 162 which are interconnected by signaling link 169. Although only two signal transfer points are shown for clarity, an operational CCS system contains many more STPs. STP 160 is interconnected to originating switch 110 and central office switch 120 via signaling links 161 and 163, respectively. Signal transfer point 162 is interconnected to destination switch 130 by signaling link 167.

Also shown are ATM switches 140 and 150 which comprise a transmission network used to interconnect the central office switches in telecommunications network 100. ATM switch 140 and 150 are interconnected by switched virtual channel 153. Since the majority of existing central office switches operate in synchronous transfer mode, synchronous-to-asynchronous converter (SAC) units are a required interface between central office switches and ATM switches. In this example, ATM switch 140 is interconnected to SAC units 145 and 175 via virtual channels 147 and 177, respectively. Similarly, central office switches 110 and 130 are interconnected to SAC units 145 and 175 via bi-directional trunks 113 and 133, respectively. Central office switch 120 is interconnected to SAC unit 155 via bi-directional trunk 123. SAC unit 155 is interconnected to ATM switch 150 via virtual channel 157.

In alternative embodiments, the transmission network may include or exclusively comprise synchronous switches. The transmission network may also comprise other asynchronous transmission means, such as frame relay. In this example, a synchronous transmission network comprises switch 190 which maintains signaling link 191 to VTS 182. Synchronous switch 190 is also shown with established bi-directional trunks 193 and 195 to originating switch 110 and destination switch 130, respectively. The presence of synchronous switch 190 in telecommunications network 100 is optional.

Virtual transport servers (VTS) 180 and 182 act as central call path (route) determination systems. Particularly, VTSs maintain routing information including the point code identification of central office switches and SAC units associated with destination trunk groups in databases 181 and 187, respectively. In the preferred embodiment, each VTS is interconnected to a signal transfer point (or a switch with facility-associated signaling) in the CCS system. In this example, VTS 180 is interconnected to STPs 160 and 162 by signaling links 164 and 168. VTS 182 is interconnected to STPs 160 and 162 by signaling links 184 and 188. Changes in routing protocol, such as a change in the destination trunk of a particular central office switch, may be accomplished for all VTSs in telecommunications network 100 by updating information in a single VTS. Particularly, a first VTS is updated so that it may then access the CCS system or the transmission network to cause routing data in other VTSs to be updated. During operation, VTS 180 and VTS 182 receive all CCS messages processed by the signal transfer points in telecommunications network 100. Receipt of an initial address message (IAM) in a VTS initiates a call path determination process described in detail below.

Figure 2A:
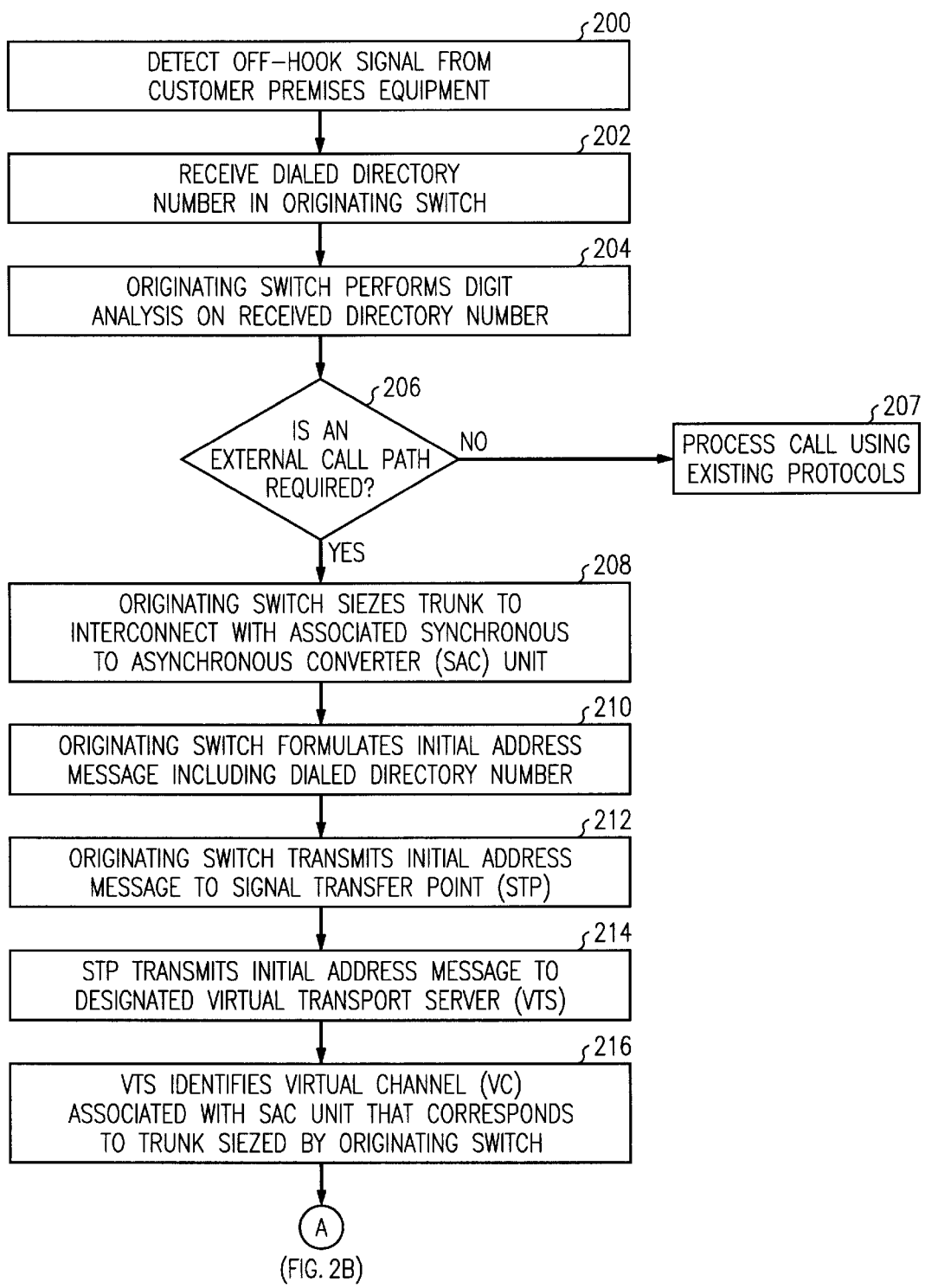
Figure 2B:
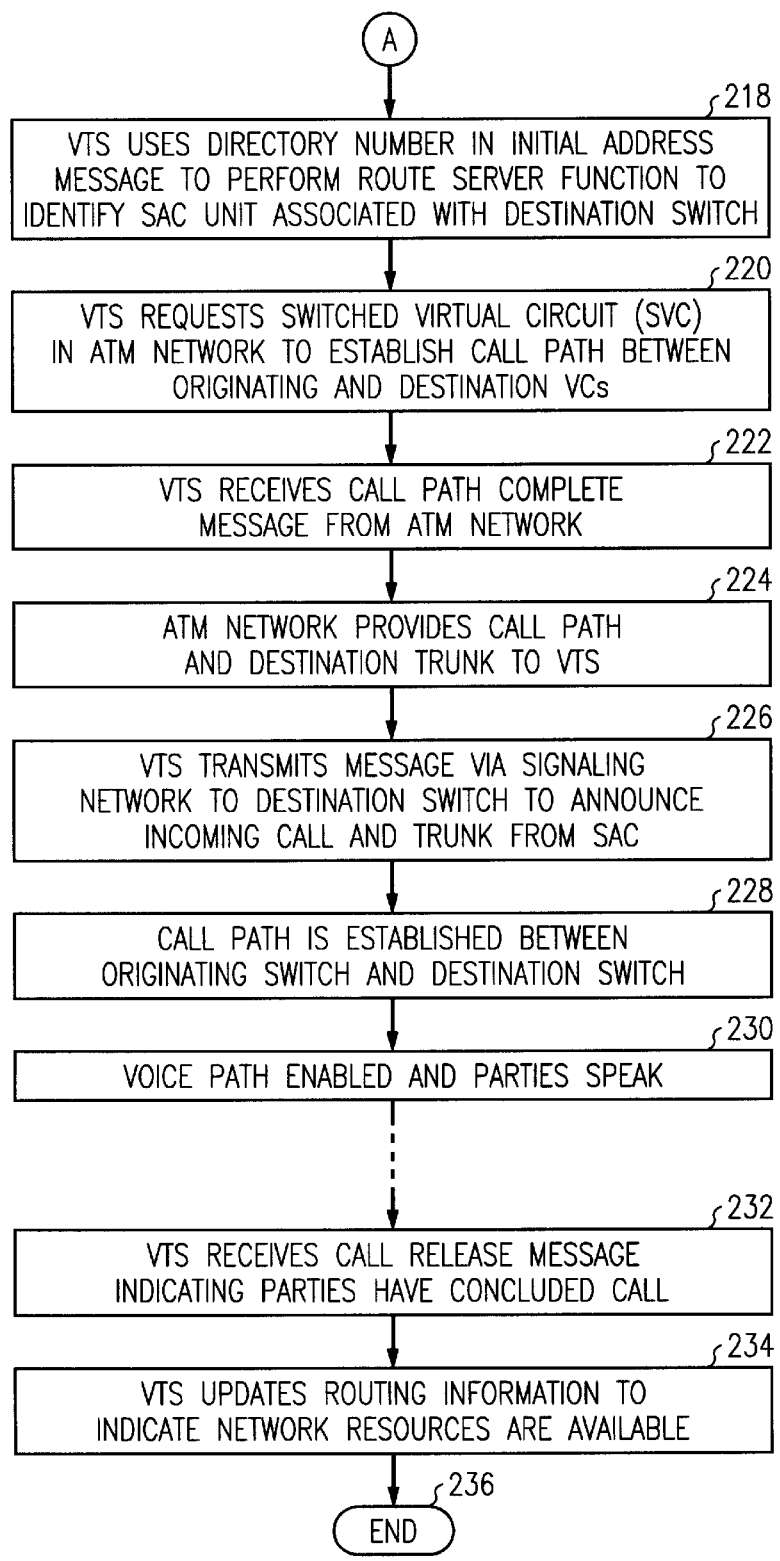

FIGS. 2A and 2B are flow diagrams of the steps performed in telecommunications network 100 in accordance with the preferred embodiment of the method of the present invention. For purposes of example, assume that a caller associated with CPE 112 wishes to place a call to a party served by CPE 132. The process begins in step 200 in which originating switch 110 detects an off-hook signal from subscriber line 111. As shown in FIG. 1, subscriber line 111 serves CPE 112. In step 202, originating switch 110 receives dialed digits over subscriber line 111 from the caller using CPE 112. In this example, originating switch 110 receives digits "812 777-2338" or, the directory number associated with CPE 132. In step 204 originating switch 110 performs digit analysis on the received directory number.

The process continues to decision step 206 in which the originating switch determines whether digit analysis indicates that an external call path is required to complete the requested call. An external call path is required if the called party is served by any switch other than the originating switch. In this example, the called party is not only served by another switch, but is also associated with a different area code. If the outcome of decision step 206 is a "NO" determination, (that is, the called party is found on the service base of the originating switch) the process continues to step 207 in which the originating switch processes the call using existing protocols. If, as in this case, the outcome of decision step 206 is a "YES" determination, the process continues to step 208 in which the originating switch seizes a trunk to establish a connection with its associated SAC unit. In this case, originating switch 110 seizes trunk 113 to SAC unit 145. In step 210, the originating switch formulates an initial address message (IAM) including the dialed directory number associated with the requested call. The process continues to step 212 in which the originating switch transmits the formulated IAM to the signal transfer point which serves the switch. In this embodiment, originating switch 110 transmits an initial address message including the dialed directory number "812 777-2338" to STP 160 over signaling link 161. In step 214, the STP transmits the received IAM to a designated VTS. In this example, STP 160 transmits the IAM to VTS 180. In accordance with the preferred embodiment of the present invention, every signaling message processed by an STP is transmitted to a designated VTS.

The process continues to step 216 in which the VTS 180 uses information stored in database 181 to identify the virtual channel (VC) associated with the SAC unit serving the originating switch which corresponds to the trunk seized by the originating switch. In this example, VTS 180 identifies VC 147 of SAC unit 145 which corresponds to bi-directional trunk 113 (trunk 113 was seized by originating switch 113 in step 208 described above). If a synchronous transmission network is used, the VTS simply chooses a trunk from the synchronous switch to the destination switch in step 216.

In this case, the process continues through connector "A" to FIG. 2B In step 218, the VTS uses the directory number in the IAM to perform a route server function as it identifies the SAC unit and VC associated with the destination switch. In this example, VTS 180 identifies SAC unit 175 and VC 177. If necessary, in step 220, the VTS requests a switched virtual circuit (SVC), such as SVC 153, in the ATM network to establish a call path between the originating and destination switch. In this example, a SVC is unnecessary since ATM switch 140 is interconnected to the SAC unit which serves the destination switch. In an alternative embodiment, the VTS may identify a permanent virtual circuit (PVC) associated with the originating SAC unit and the destination SAC unit. If a PVC is used, the process continues to step 226 described below.

In this case, however, the process continues to step 222 in which the VTS receives a call path complete message from the ATM switch. A call path complete message indicates that the ATM network has identified and established a call path to the destination switch. In this embodiment, assume that ATM switch 140 identified a call path from originating switch 110 to destination switch 130 via SAC unit 145, VC 147, ATM switch 140, VC 177, SAC unit 175 and bidirectional trunk 133. The process continues to step 224 in which the ATM network provides call path and destination trunk information to the VTS. In this example, the destination trunk (or the trunk group which interconnects the SAC unit to the destination switch) is bi-directional trunk 133.

In step 226, the VTS transmits an incoming call message to the destination switch via the CCS system. The incoming call message includes the caller's directory number, destination trunk information and the called party's directory number so that the destination switch can terminate the call to the appropriate subscriber line. In step 228, the call path devised by the ATM network is established between the originating switch and the destination switch. The process continues to step 230 in which the call path between caller and called party is connected to enable voice transmission, and the parties speak.

At some subsequent time, the caller and called party conclude the call. In step 232, the VTS receives, via the CCS system, a call release message issued by the destination switch indicating that the parties have concluded the call. In this example, destination switch 130 sends call release message to STP 162 which transmits the release message to VTS 180. The process continues to step 234 in which the VTS updates routing information in its database to indicate that network resources used for the call are relinquished and available. The process ends in step 236.

Advantageously, the present invention allows existing central office switches to be relieved of call routing functions without requiring changes in existing central office switch call processing protocols since all routing requests continue to be processed by the CCS system. Also, changes in routing protocol, such as those which may be required in local number portability situations, are accomplished by updating a single VTS instead of maintaining a separate database which must be accessed by switches for routing protocol variations. Further, replacement of an extensive tandem or toll switch network which performs both routing and switching functions reduces network maintenance and monitoring costs. While the invention is described with reference to a preferred embodiment, it is understood that those skilled in the art may devise numerous other arrangements without departing from the scope of the invention.

What is claimed is:

1. A telecommunications network comprising:

a plurality of central office switches, each central office switch serving at least one subscriber line;

a plurality of designated virtual transport servers (VTS) comprising databases with routing information;

a plurality of synchronous to asynchronous converters (SAC) external to said central office switches and said designated VTSs, a common channel signaling (CCS) network interconnected to the plurality of central office switches, SACs and VTSs for relaying messages among said central office switches, SACs and VTSs; and said designated VTSs establishing connections for calls by receiving all messages processed by the CCS network.

2. The telecommunications network of claim 1 wherein the signaling network interconnected to the plurality of central office switches includes a plurality of signal transfer points.

3. The telecommunications network of claim 1 wherein the VTS is interconnected to at least one switch in a transmission network.

4. The telecommunications network of claim 3 wherein the transmission network operates in asynchronous transfer mode.

5. The telecommunications network of claim 1 wherein the switching means operates solely in accordance with routing information from the VTS.

6. In a telecommunications network comprising a plurality of central office switches, each central office switch interconnected to a common channel signaling (CCS) network, a method for establishing calls comprises the steps of:

storing routing information in databases found in a plurality of designated virtual transport servers (VTS);

interconnecting a plurality of synchronous to asynchronous converters (SACs) external to said central office switches and said designated VTSs;

receiving messages processed by the CCS network which is interconnected to the plurality of central office switches, SACs and VTSs for relaxing messages among said central office switches; and the VTS establishing call paths to destination trunks for all calls using point code identification of central office switches and synchronous to asynchronous conversion units.

7. The method of claim 6 further comprising the step of:

an originating switch performing a call switching function.

8. The method of claim 6 further comprises the step of:

receiving a call release message in the VTS; and releasing network resources associated with a switch interconnected to the VTS upon completion of the call.

9. The method of claim 6 further comprising the step of:

the VTS transmitting an incoming call message to a destination switch via the CCS network to announce the call.

10. The method of claim 6 further comprising the step of:

using an asynchronous transfer mode (ATM) switch interconnected to the VTS to establish the call.

11. The method of claim 6 further comprising the step of:

a first VTS updating routing information in a second VTS via an ATM switch.

12. The method of claim 6 further comprising the step of:

using a synchronous switch interconnected to the VTS to establish the call.

13. The method of claim 6 further comprising the step of:

a first VTS updating routing information in a second VTS via the CCS network.

* * * * *